(12) United States Patent
Choi et al.

(10) Patent No.: US 7,988,509 B2
(45) Date of Patent: Aug. 2, 2011

(54) FLOW CONTROL MECHANISM FOR SHIP HAVING COOLING SYSTEM

(75) Inventors: Soon-ho Choi, Daejeon (KR); Sang-kyu Choi, Daejeon (KR); Sung-mok Ahn, Daejeon (KR); Seung-myun Hwangbo, Daejeon (KR)

(73) Assignee: Samsung Heavy Ind. Co., Ltd., Seoul (KR)

( * ) Notice: Subject to any disclaimer, the term of this patent is extended or adjusted under 35 U.S.C. 154(b) by 673 days.

(21) Appl. No.: 11/916,312

(22) PCT Filed: Jan. 18, 2006

(86) PCT No.: PCT/KR2006/000193
§ 371 (c)(1),
(2), (4) Date: Dec. 3, 2007

(87) PCT Pub. No.: WO2006/137638
PCT Pub. Date: Dec. 28, 2006

(65) Prior Publication Data
US 2010/0144222 A1  Jun. 10, 2010

(30) Foreign Application Priority Data

Jun. 20, 2005  (KR) .................... 20-2005-0017619 U
Jun. 22, 2005  (KR) .................... 20-2005-0018064 U
Jun. 22, 2005  (KR) .................... 20-2005-0018065 U (51) Int. Cl.
B63H 21/14   (2006.01)
(52) U.S. Cl. .................................................. 440/88 C
(58) Field of Classification Search ............... 440/88 C
See application file for complete search history.

(56) References Cited

U.S. PATENT DOCUMENTS

| 1,198,274 | A | * | 9/1916 | Reece ........................... 181/235 |
| 3,885,516 | A | * | 5/1975 | Uroshevich et al. ............. 440/67 |
| 4,069,788 | A | * | 1/1978 | Nitzki .......................... 440/88 R |
| 5,890,939 | A | * | 4/1999 | Cotton ........................ 440/88 M |

FOREIGN PATENT DOCUMENTS

| JP | 1-27520 A | 8/1989 |
| JP | 09-272489 A | 10/1997 |
| JP | 10-007086 A | 1/1998 |

OTHER PUBLICATIONS

Microfilm of the specification and drawings annexed to the request of Japanese Utility Model Application No. 46710/1986 (Laid-Open No. 157697/1987) (Mitsubishi Heavy Industries, Ltd.), Oct. 6, 1987.
International Search Report for Corresponding International Patent Application No. PCT/KR2006/000193.

* cited by examiner

Primary Examiner — Stephen Avila
(74) Attorney, Agent, or Firm — Locke Lord Bissell & Liddell LLP (57) ABSTRACT

A flow control mechanism is provided for controlling a stern flow field disturbed by cooling water discharged from the cooling water outlet of a ship. The flow control mechanism is located within a distance, which corresponds to three times the diameter of the cooling water outlet, from the cooling water outlet, is installed at an angle from 16° to 30° with respect to the horizontal plane of a hull, and has a vertical height, which is within a range from 0.2 times to 0.6 times the diameter of the cooling water outlet in a vertical direction of the hull, and a horizontal width, which is within a range from 0.5 times to 1.3 times the diameter of the cooling water outlet in a horizontal direction of the hull. Thereby, the flow control mechanism restores the distribution of wake flow that encounters a propeller so that the distribution of the wake flow is symmetrical around the central axis of the hull, and reduces the generation of a cavity. Thus, the vibration performance of the ship is improved, and the propulsive efficiency of the ship is also improved.

4 Claims, 14 Drawing Sheets

FLOW CONTROL MECHANISM FOR SHIP HAVING COOLING SYSTEM

The present application claims priority as a 35 U.S.C. §371 National stage filing of International Patent Application No. PCT/KR2006/000193, filed Jan. 18, 2006, which claims priority to Korean Patent Application No. 20-2005-0017619, filed Jun. 20, 2005, Korean Patent Application No. 20-2005-0018064, filed Jun. 22, 2005, and Korean Patent Application No. 20-2005-0018065, filed Jun. 22, 2005, the contents of all of which are incorporated herein by reference in their entirety.

TECHNICAL FIELD

The present invention relates to a flow control mechanism for a ship having a cooling system, which prevents a flow field behind a cooling water outlet, which is installed in the surface of a hull on the port side of the engine room portion of a liquefied natural gas (LNG) carrier using a steam turbine, from being disturbed by cooling water discharged through the cooling water outlet, thereby reducing the vibration of a hull.

BACKGROUND ART

In known LNG carriers, LNG in a cargo hold is vaporized to generate boil-off gas (BOG). Since it is very expensive to re-condense this BOG, the BOG generated in the cargo hold of the LNG carrier is used with a steam turbine, which is a main engine. The steam turbine makes use of steam, and thus requires a condenser, etc. as an apparatus for cooling this steam. The system for cooling this condenser employs a scoop cooling system or a pump cooling system. In this system, an inlet through which sea water is introduced (cooling water inlet) and an outlet (cooling water outlet) are installed in the surface of the hull. In the scoop cooling system, the outlet protrudes in the shape of a lip. In the pump cooling system, no lip is provided for the outlet.

This cooling water outlet is located in the surface of the hull on the port side of an engine room portion of the LNG carrier, that is, on the left-hand side of the hull towards the stern when viewed from the stern of the hull. When the cooling water is discharged through the cooling water outlet, the flow field behind the cooling water outlet is turbulent. This flow-field turbulence, occurring behind the cooling water outlet, speeds up the axial flow of the sea water introduced toward the upper part of a propeller, and changes the distribution of a wake flow so that the distribution of the wake flow is asymmetrical around the central axis of the hull. In the case in which the propeller is situated behind a model ship or an actual ship, the propeller is operated in the fluid, which becomes turbulent while passing along the hull. In general, the fluid around the stern has a slowing effect on the ship. This slowing flow is called wake flow.

This irregular distribution of wake flow makes the load applied to the blades non-uniform when the propeller is operated, thereby giving periodical force and moment to the hull, and furthermore leading to vibration of the hull. In comparison with the case in which no water is discharged, such wake flow increases cavitation of the propeller, which results in approximate doubling of the variable pressure of the hull. The term "cavitation" (formation of cavities) refers to the phenomenon in which water is converted from a liquid state to a gas state when ambient pressure becomes lower than vapor pressure under constant pressure.

This increase in the variable pressure of the hull not only increases the vibration of the hull but also reduces propulsive performance of the ship.

As described above, the cooling water causes the flow-field turbulence at the stern, and this flow-field turbulence changes the distribution of the wake flow so that the distribution of the wake flow is asymmetrical around the central axis of the hull. For this reason, no mechanism of decreasing the vibration of the hull has been known to date.

DISCLOSURE

Technical Problem

Accordingly, the present invention has been made keeping in mind the above problems occurring in the prior art, and an object of the present invention is to provide a flow control mechanism for a ship, in which the turbulence of a flow field caused by cooling water discharged from a cooling water outlet at the stern of the ship is prevented, thereby reducing the vibration of a hull and improving propulsive performance of the ship.

In order to achieve the above object, according to a first embodiment of the present invention, there is provided a flow control mechanism, which controls the stern flow field, disturbed by cooling water discharged from the cooling water outlet of a ship. The flow control mechanism is located within a distance that corresponds to three times the diameter of the cooling water outlet, from the cooling water outlet, is installed at an angle from 16° to 30° with respect to the horizontal plane of a hull, and has a vertical height, which is within a range from 0.2 times to 0.6 times the diameter of the cooling water outlet in the vertical direction of the hull, and a horizontal width, which is within a range from 0.5 times to 1.3 times the diameter of the cooling water outlet in the horizontal direction of the hull. Thereby, the flow control mechanism can be applied to both a scoop cooling system and a pump cooling system, and prevents the cooling water, which is discharged in a vortex ahead of the cooling water outlet, from reaching the stern flow field, or changes the moving path of the cooling water behind the cooling water outlet to prevent the cooling water from reaching the stern flow field.

Preferably, the flow control mechanism has a transverse width, which is within a range from 0.2 times to 0.6 times the diameter of the cooling water outlet and extends from the outer surface of the hull in the transverse direction of the hull.

According to a second embodiment of the present invention, there is provided a flow control mechanism that controls the stern flow field, which is disturbed by cooling water discharged from the cooling water outlet of a ship. The flow control mechanism has the shape of a triangular pyramid that is located within 1 station ahead of the cooling water outlet along a streamline passing through the cooling water outlet; the triangular pyramid has a base, which is an isosceles triangle and has a base within a range from 0.2 times to 0.3 times as long as the diameter of the cooling water outlet, and a height within a range from 1.5 times to 1.7 times as long as the diameter of the cooling water outlet; a perpendicular line that extends from the apex of the triangular pyramid to the base of the triangular pyramid has a range from 0.6 times to 0.8 times as long as the diameter of the cooling water outlet; and the angle between the height of the base of the triangular pyramid and the streamline has a range from 10° to 15°. Thereby, the flow control mechanism can be applied both to a scoop cooling system and a pump cooling system, and prevents the cooling water, which is discharged in a vortex ahead of the cooling water outlet, from reaching the stern flow field.

Preferably, the flow control mechanism is located within 0.8 stations ahead of the cooling water outlet along the streamline passing through the cooling water outlet.

According to a third embodiment of the present invention, there is provided a flow control mechanism, which controls a stern flow field disturbed by cooling water discharged from the cooling water outlet of a ship. The flow control mechanism is attached to the front outer circumference of the cooling water outlet, and has an inclined structure in which upper-side and lower-side heights from the surface of a hull are different from each other. Thereby, the flow control mechanism can be applied to both a scoop cooling system and a pump cooling system, and prevents the cooling water, which is discharged in a vortex ahead of the cooling water outlet, from reaching the stern flow field.

Preferably, the upper-side height of the flow control mechanism has a range from 0.3 times to 0.5 times the average height of the flow control mechanism, and the lower-side height of the flow control mechanism has a range from 1.5 times to 1.7 times the average height of the flow control mechanism.

BEST MODE

Reference will now be made in greater detail to exemplary embodiments of the invention with reference to the accompanying drawings.

The flow control mechanism for a ship having a cooling system according to the present invention is changed in size, thickness, mounted position, etc. depending on the size and diameter of the cooling water outlet of the ship. The ship to which this embodiment is applied has a length of 270 meters, and the cooling water outlet formed at the stern thereof has a diameter of 1.8 meters. Here, the length of the ship is given as length between fore and aft perpendiculars (LBP). "Fore perpendicular" refers to the line that vertically passes through the intersection between the design waterline and the front surface of the stem stock. "Aft perpendicular" refers to the line that vertically passes through the intersection between the design waterline and the rear surface of the rudder post in the case of a ship with a rudder post, or the line that vertically passes through the intersection between the design waterline and the central line of the rudder stock in the case of a ship without a rudder post.

First Embodiment

Figure 1:
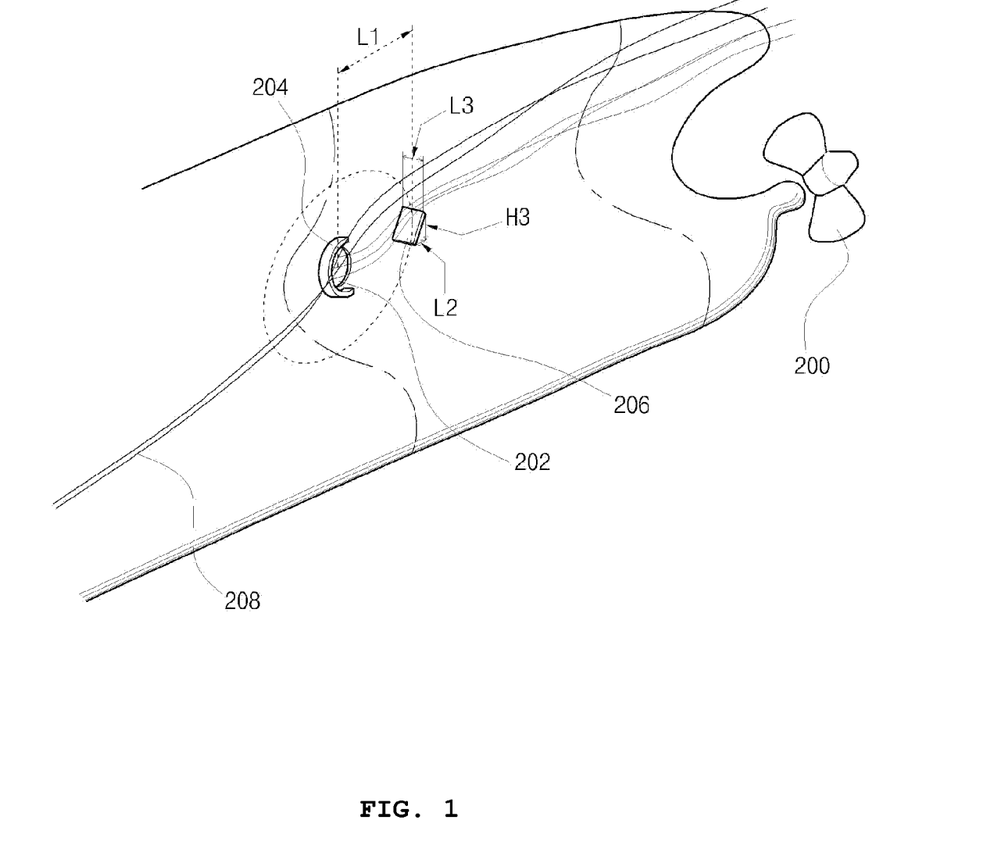
FIG. 1 is a perspective view illustrating a ship on which the first embodiment of a stern flow control mechanism according to the present invention is installed.
Figure 2:
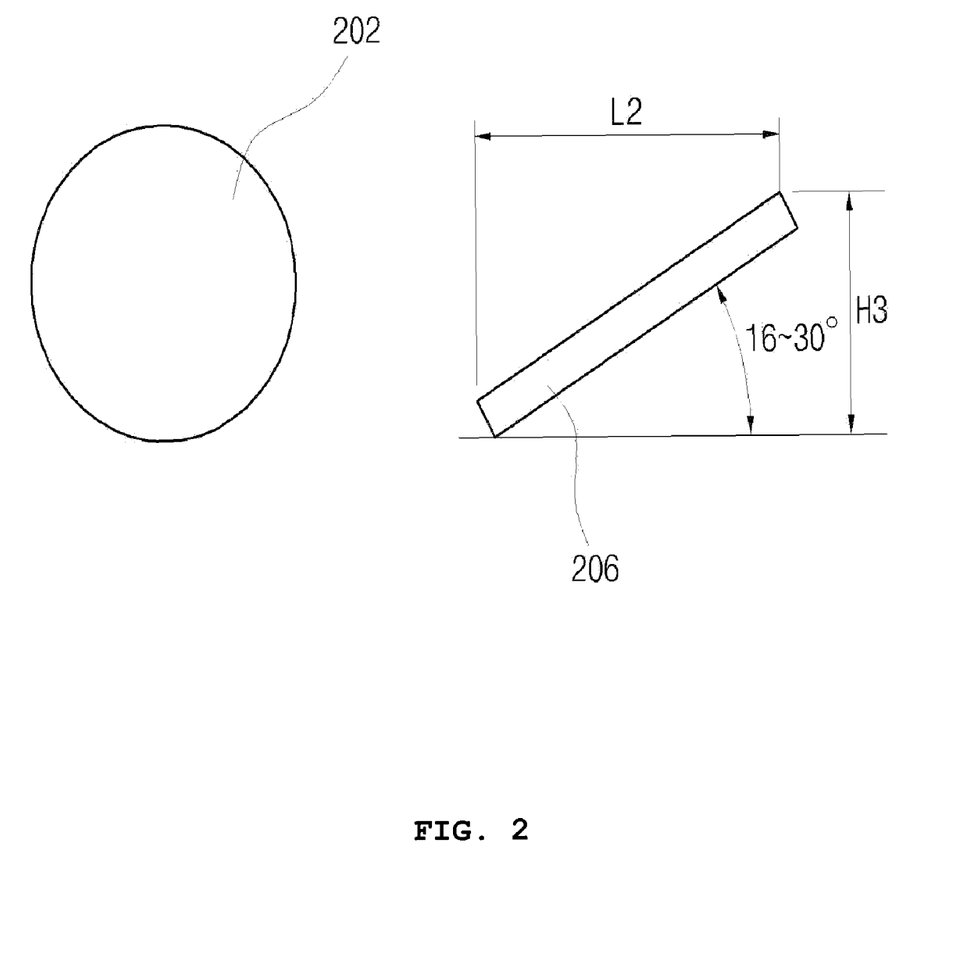
FIG. 2 is a side view illustrating the first embodiment of FIG. 1.

FIG. 1 is a perspective view illustrating a ship on which the first embodiment of a stern flow control mechanism according to the present invention is installed, and FIG. 2 is a side view illustrating the first embodiment of FIG. 1. As can be seen from FIG. 1, the ship is equipped with a propeller 200, which propels the ship, at the stern. Ahead of the propeller is located a cooling water outlet 202. Around the front half of the circumference of the cooling water outlet 202 is located a lip-like attachment 204.

The present embodiment 206 is located within a distance L1 that does not exceed three times the diameter of the cooling water outlet, from the cooling water outlet 202, and preferably behind the cooling water outlet 202. The present embodiment 206 is attached to the outer surface of a hull by, for instance, welding.

The present embodiment 206 has the shape of a rectangular thin plate. The present embodiment 206 is attached to the outer surface of the hull at an angle from 16° to 30° with respect to a horizontal plane of the hull. At this time, the present embodiment 206 has: a vertical height H3, which is set within a range from 0.2 times to 0.6 times the diameter of the cooling water outlet 202, in the vertical direction of the hull; a horizontal width L2, which is set within a range from 0.5 times to 1.3 times the diameter of the cooling water outlet 202 in the horizontal direction of the hull; and a transverse width L3, which is set from the outer surface of the hull within a range from 0.2 times to 0.6 times the diameter of the cooling water outlet 202 in the transverse direction of the hull.

In the case in which the present embodiment 206 has an installation angle of 16° or less, the vertical height H3 of 0.2 times the diameter of the cooling water outlet 202 or less, the horizontal width L2 of 0.5 times the diameter of the cooling water outlet 202 or less, and the transverse width L3 of 0.2 times the diameter of the cooling water outlet 202 or less, the stern flow control effect is reduced. Further, in the case in which the present embodiment 206 has an installation angle of 30° or more, a vertical height H3 of 0.6 times the diameter of the cooling water outlet 202 or more, a horizontal width L2 of 1.3 times the diameter of the cooling water outlet 202 or more, and a transverse width L3 of 0.6 times the diameter of the cooling water outlet 202 or more, the added drag caused by the present embodiment 206 is increased.

When attached ahead of the cooling water outlet 202, the present embodiment 206 creates a vortex ahead of the cooling water outlet 202. This vortex causes the cooling water to deviate from the moving path of the cooling water before the present embodiment 206 is attached. In other words, the present embodiment 206 prohibits the cooling water from reaching the stern flow field, and thus changes the distribution of wake flow that encounters the propeller so that the distribution of the wake flow is symmetrical around the central axis of the hull.

In contrast, when attached behind the cooling water outlet 202, the present embodiment 206 changes the moving path of the cooling water to prevent the cooling water from reaching the stern flow field, and thus changes the distribution of wake flow, which encounters the propeller, so that the distribution of the wake flow is symmetrical around the central axis of the hull.

Figure 3:
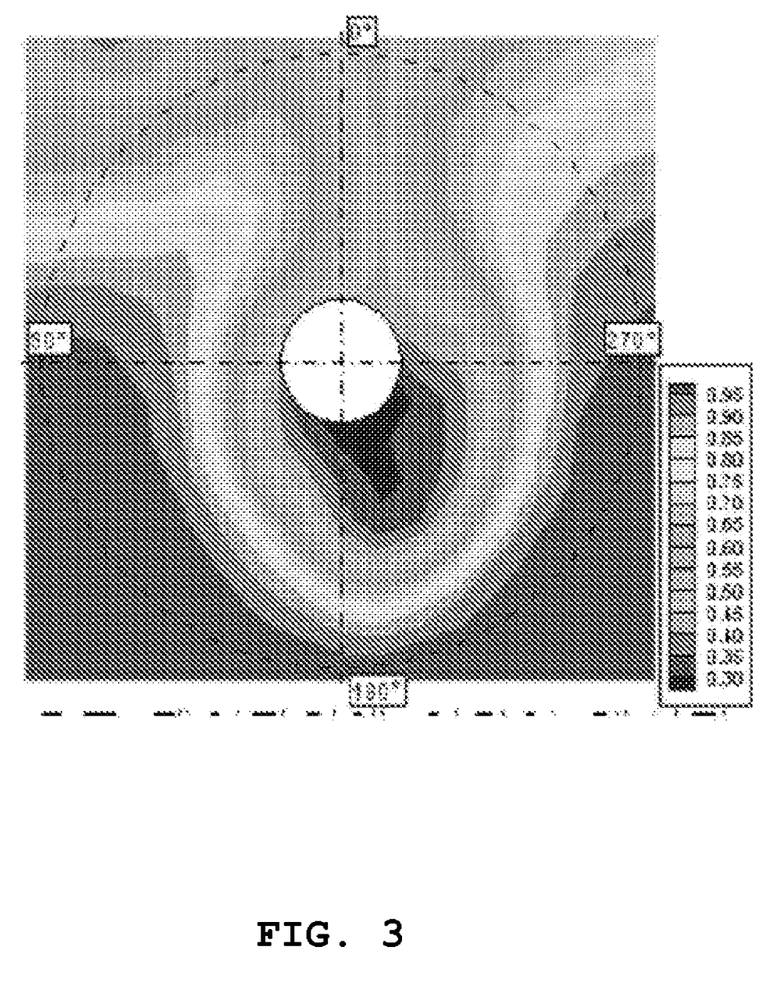
FIG. 3 illustrates the distribution of flow velocity across a propeller surface in the case in which the embodiment of FIG. 1 is attached behind the cooling water outlet when viewed from the stern.

FIG. 3 illustrates the distribution of flow velocity across a propeller surface in the case in which the embodiment of FIG. 1 is attached behind the cooling water outlet when viewed from the stern. In this case, it can be seen that the distribution of the wake flow, which encounters the propeller, is restored to be symmetrical around the central axis of the hull.

Figure 4:
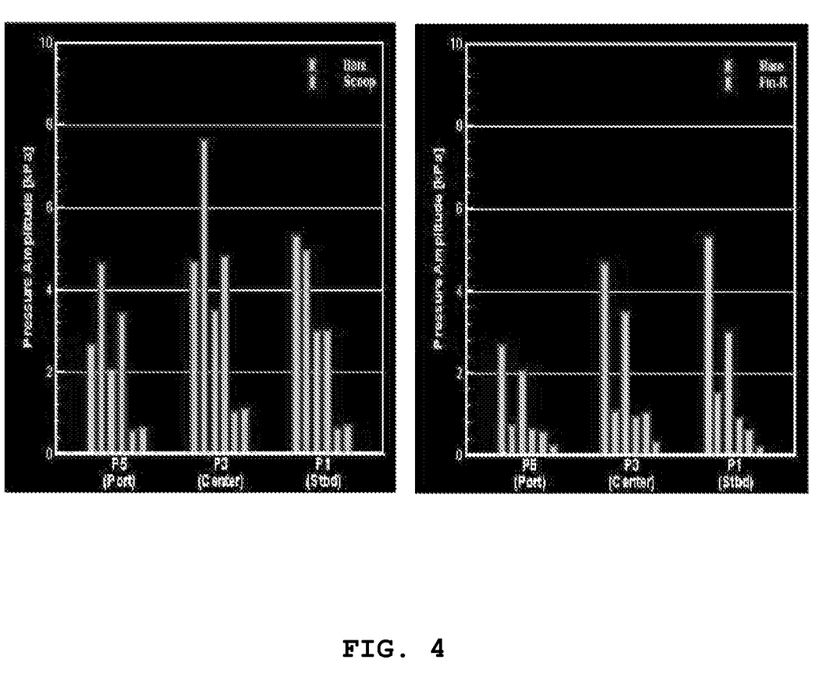
FIG. 4 is a graph showing the variable pressure of the hull when the embodiment of FIG. 1 is attached behind the cooling water outlet.

FIG. 4 is a graph showing the variable pressure of the hull when the embodiment of FIG. 1 is attached behind the cooling water outlet. The left-hand graph of FIG. 4 shows the variable pressure of the hull with respect to the cases in which the cooling water is discharged and in which no cooling water is discharged. It can be seen that the variable pressure of the hull is greater in the former case. The right-hand graph of FIG. 4 shows the variable pressure of the hull in cases in which no cooling water is discharged and in which cooling water is discharged, and in which the present embodiment is attached behind the cooling water outlet. It can be seen that the variable pressure of the hull is decreased in the latter case.

In the present embodiment, the stern flow control mechanism has the shape of a rectangular thin plate. However, in the other embodiments, the stern flow control mechanism can be modified to have the shape of a triangular thin plate.

Second Embodiment

Hereinafter, the present embodiment will be described with reference only to differences from the first embodiment.

Figure 5:
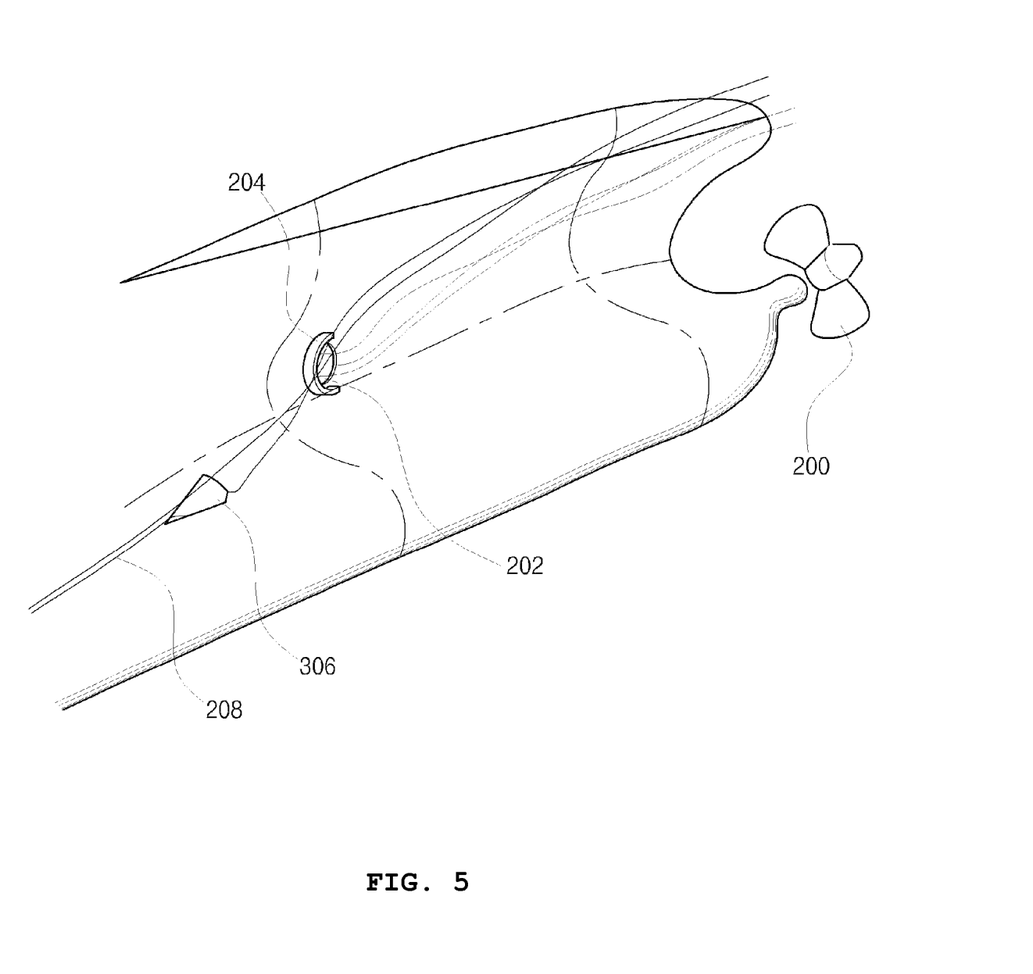
FIG. 5 is a perspective view illustrating a ship on which the second embodiment of a flow control mechanism according to the present invention is mounted.

FIG. 5 is a perspective view illustrating a ship on which the second embodiment of the flow control mechanism according to the present invention is mounted.

The present embodiment 306 is attached ahead of the cooling water outlet 202 along a streamline 208 spaced apart from the cooling water outlet 202 by a distance of 0.8 station. Here, "station" refers to any one of 20 sections into which the LBP is equally divided. The stations are numbered from the stern. Thus, the first or rearmost station is called station No. 0, and the last or front most station is called station No. 20. In the present embodiment, each station has a length of 13.5 m, and thus 0.8 stations is equal to a length of 10.8 m (=13.5 m×0.8). The present embodiment 306 is attached ahead of the cooling water outlet 202 by, for instance, welding.

Figure 6:
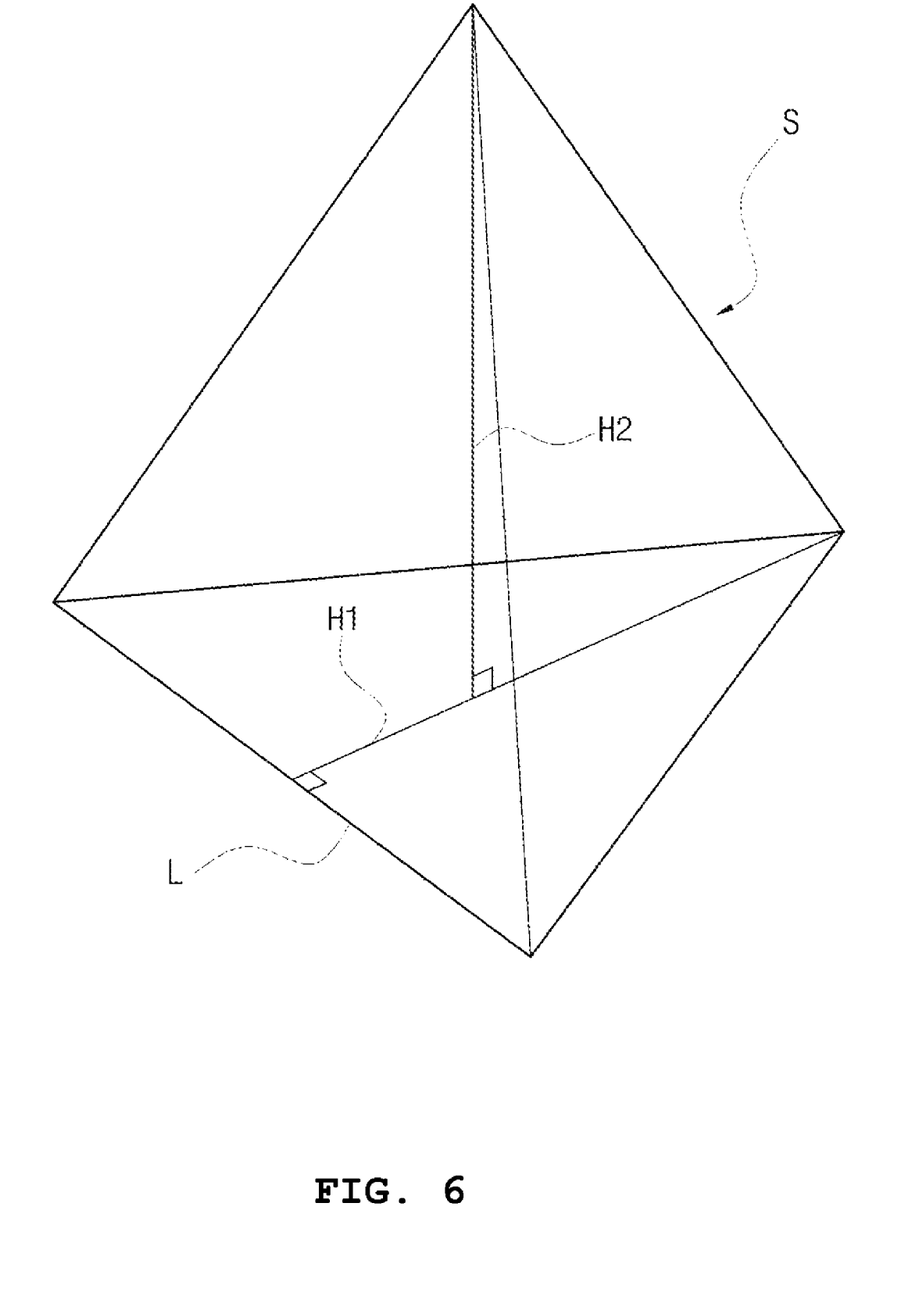
FIG. 6 is a perspective view illustrating the second embodiment of FIG. 5.

FIG. 6 is a perspective view illustrating the second embodiment of FIG. 5.

The present embodiment 306 has the shape of a triangular pyramid. The base of the triangular pyramid is an isosceles triangle, the base L of which has a length of 0.46 m, and the height H1 of which has a length of 2.87 m. A perpendicular line H2 (hereinafter, referred to as the "height of the triangular pyramid"), which extends from the vertex of the triangular pyramid (hereinafter, referred to as the "apex of the triangular pyramid"), which is opposite base of the triangular pyramid, to the base of the triangular pyramid, has a length of 1.26 m. The present embodiment 306 is located such that a side S connecting the vertex opposite the base L of the isosceles triangle with the apex of the triangular pyramid splits the streamline. More specifically, the vertex opposite the base L of the isosceles triangle is located toward the stem, and the base L is located toward the stern. The angle between the height H1 of the base of the triangular pyramid and the streamline is 14°.

The present embodiment 306 creates a vortex ahead of the cooling water outlet 202. This vortex causes the cooling water to deviate from the moving path of the cooling water before the present embodiment 306 is attached. In other words, the present embodiment 306 prohibits the cooling water from reaching a stern flow field, and thus changes the distribution of the wake flow that encounters the propeller so that the distribution of the wake flow is symmetrical around the central axis of the hull.

Figure 7:
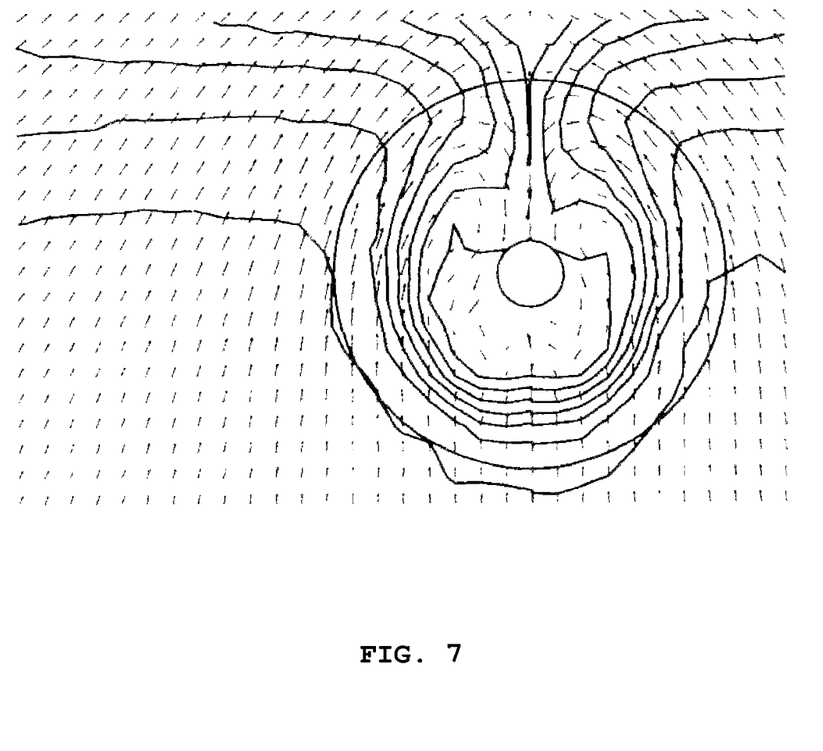
FIG. 7 illustrates the distribution of flow velocity across a propeller surface in the case in which cooling water is not discharged when viewed from the stern.
Figure 8:
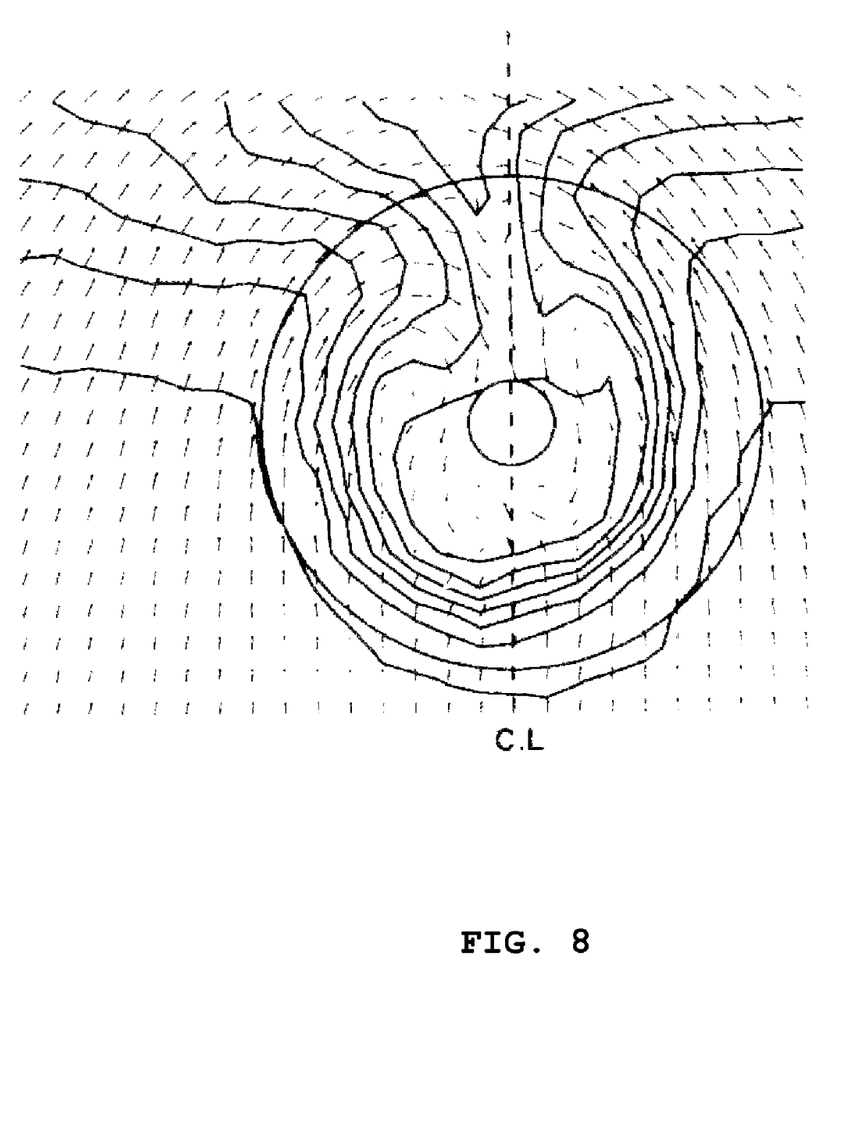
FIG. 8 illustrates the distribution of flow velocity across a propeller surface in the case in which cooling water is discharged when viewed from the stern.
Figure 9:
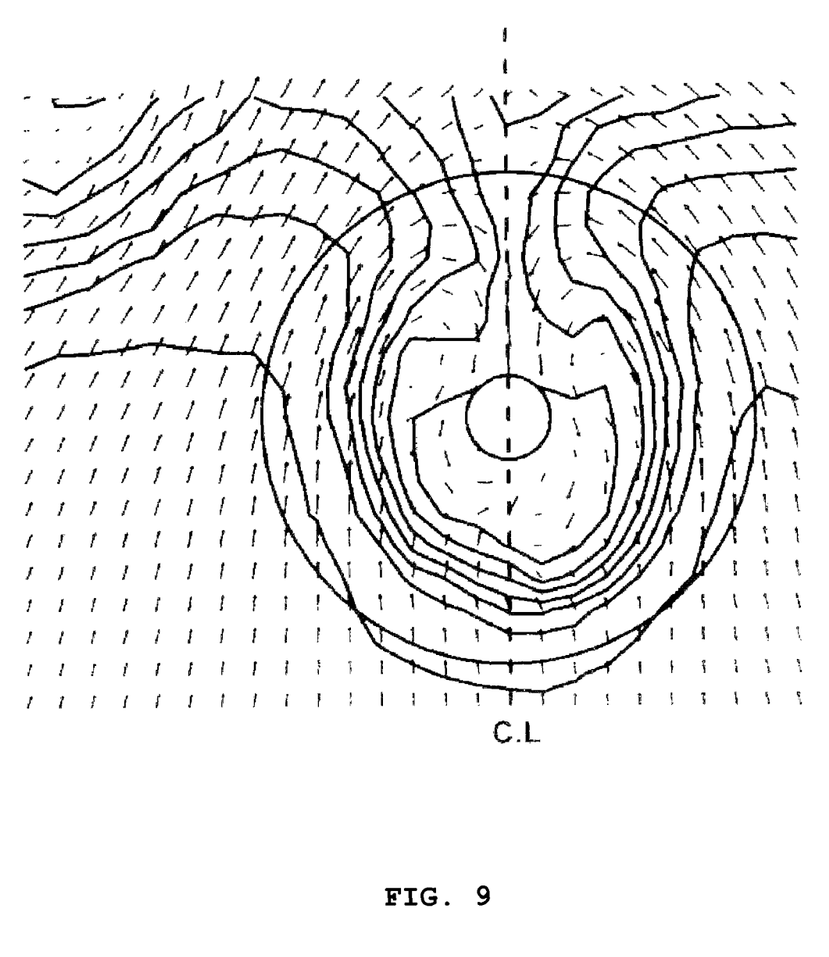
FIG. 9 illustrates the distribution of flow velocity across a propeller surface in the case in which the embodiment of FIG. 5 is attached when viewed from the stern.

FIG. 7 illustrates the distribution of flow velocity across a propeller surface in the case in which cooling water is not discharged when viewed from the stern. In this case, it can be seen that the distribution of the wake flow that encounters the propeller is symmetrical around the central axis of the hull. FIG. 8 illustrates the distribution of flow velocity across a propeller surface in the case in which cooling water is discharged when viewed from the stern. In this case, it can be seen that the distribution of the wake flow that encounters the propeller is asymmetrical around the central axis of the hull. FIG. 9 illustrates the distribution of flow velocity across a propeller surface in the case in which the embodiment of FIG. 5 is attached when viewed from the stern. In this case, it can be seen that the distribution of the wake flow that encounters the propeller is restored to be symmetrical around the central axis of the hull.

Figure 10:
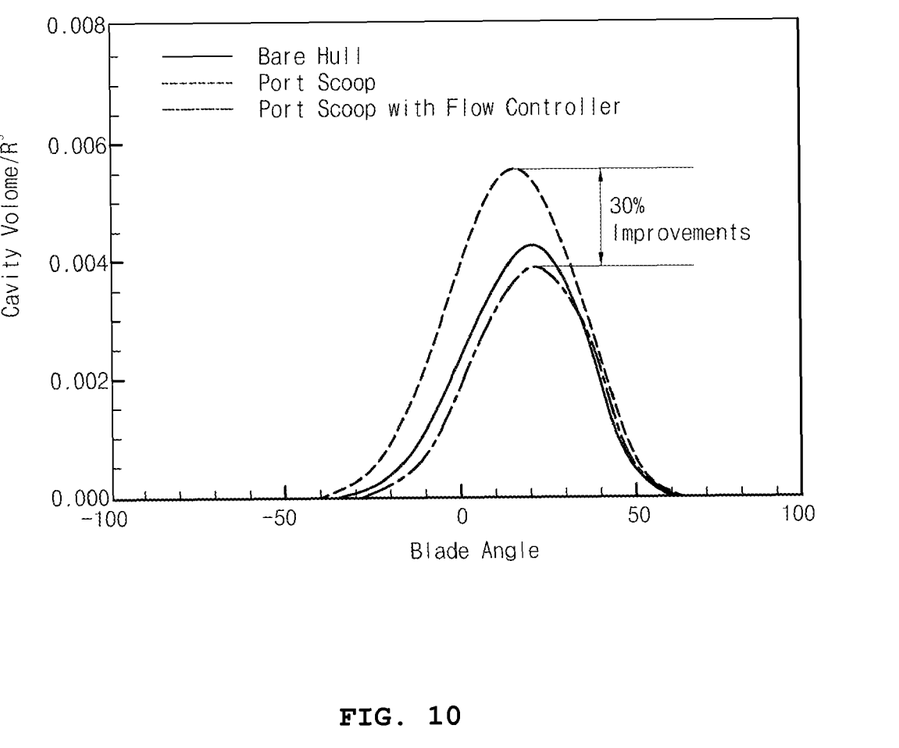
FIG. 10 is a graph showing the unit volume of a cavity with respect to the cases in which the cooling water is discharged, in which the cooling water is not discharged, and in which the embodiment of FIG. 5 is attached.

FIG. 10 is a graph showing the unit volume of a cavity with respect to cases in which the cooling water is discharged, in which no cooling water is discharged, and in which the embodiment of FIG. 5 is attached. As can be seen from FIG. 10, the unit volume of the cavity is reduced by a maximum of 30%, compared to the case in which the stern flow control mechanism 306 is not attached.

In the present embodiment, the stern flow control mechanism 306 is installed to the stern of the ship, to which a scoop cooling system is applied. However, in the other embodiments, the stern flow control mechanism can be installed to the stern of the ship to which a pump cooling system is applied.

In the present embodiment, the stern flow control mechanism 306 is located ahead of the cooling water outlet 202, which is spaced apart from the cooling water outlet 202 by a distance of 0.8 stations. However, in the other embodiments, the stern flow control mechanism can be located ahead of the cooling water outlet 202 and spaced apart therefrom from the cooling water outlet 202 by a distance ranging from 0.8 stations to 1.0 station. This is because, in the case in which the stern flow control mechanism is located further than 1.0 station away, the stern flow control effect is reduced.

In the present embodiment, the base L of the stern flow control mechanism 306 has a length of 0.46 m, the height H1 of the base of the stern flow control mechanism 306 is 2.87 m, the height H2 of the triangular pyramid is 1.26 m, and the angle between the height H1 of the base and the streamline is 14°. In the other embodiments, the length of the base L can be changed within a distance ranging from 0.2 times to 0.3 times the diameter of the cooling water outlet, the height H1 of the base within a distance ranging from 1.5 times to 1.7 times, the height H2 of the triangular pyramid within a distance ranging from 0.6 times to 0.8 times, and the angle between the height H1 of the base and the streamline within a range from 10° to 15°.

In the case in which the length of the base L exceeds 0.3 times the diameter of the cooling water outlet, in which the height H1 of the base is less than 1.5 times, in which the height H2 of the triangular pyramid exceeds 0.8 times, or in which the angle between the height H1 of the base and the streamline exceeds 15°, the pressure drag applied to the stern flow control mechanism 306 is greatly increased. In the case in which the length of the base L is less than 0.2 times the diameter of the cooling water outlet, in which the height H2 of the triangular pyramid is less than 0.6 times, or in which the angle between the height H1 of the base and the streamline is less than 10°, the vortex is not sufficiently formed, and thus the stern flow control effect is reduced. The pressure drag applied to the stern flow control mechanism 306 is greatly increased. In the case in which the height H1 of the base exceeds 1.7 times the diameter of the cooling water outlet, the surface of the stern flow control mechanism 306, with which the fluid comes into contact, is increased, and thus frictional drag is increased.

In the present embodiment, the stern flow control mechanism 306 has the shape of a triangular pyramid. However, in the other embodiments, the stern flow control mechanism 306 can have the shape of a quadrangular pyramid, a cone, or the like.

Third Embodiment

Figure 11:
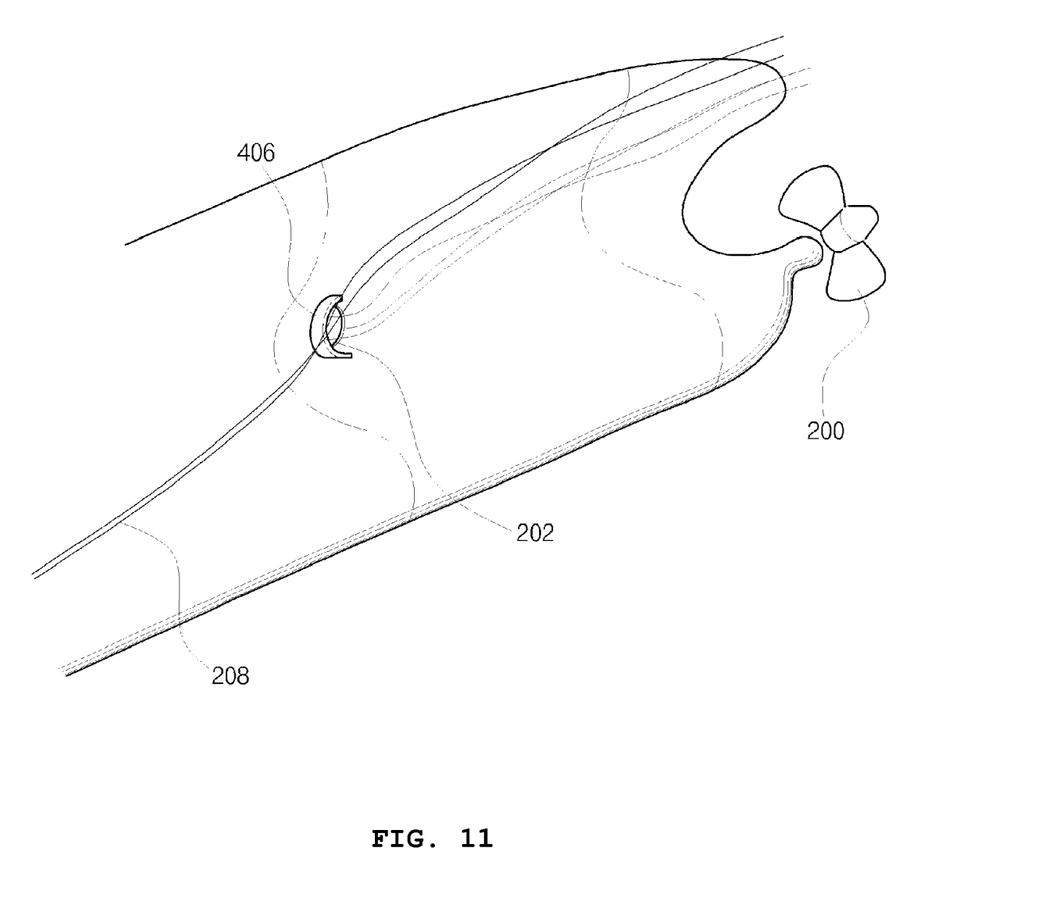
FIG. 11 is a perspective view illustrating a ship to which the third embodiment of a stern flow control mechanism according to the present invention is attached.
Figure 12:
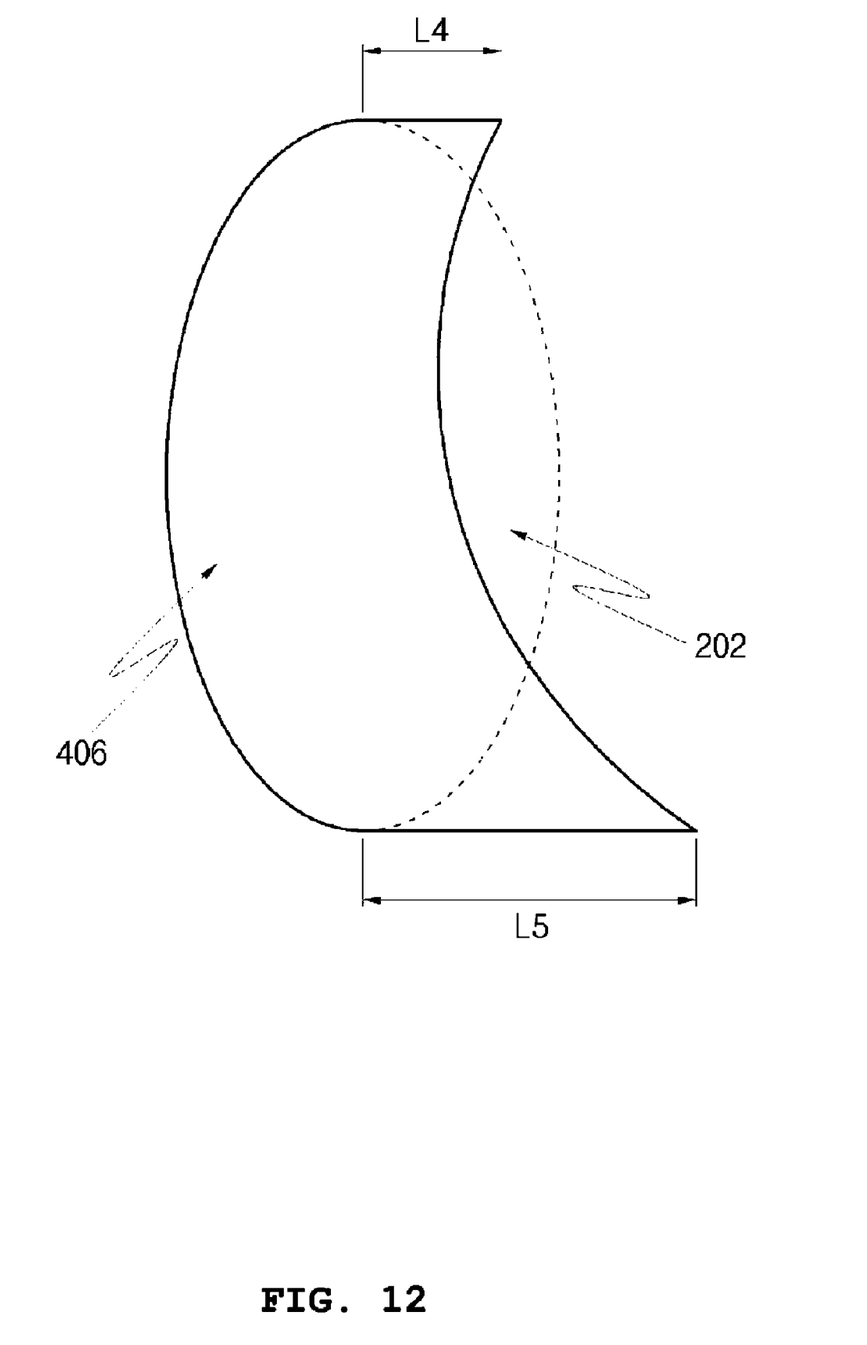
FIG. 12 is a perspective view illustrating the embodiment of FIG. 11.

FIG. 11 is a perspective view illustrating a ship to which the third embodiment of a stern flow control mechanism according to the present invention is attached. FIG. 12 is a perspective view illustrating the embodiment of FIG. 11.

The present embodiment 406 is located on the front circumference of the cooling water outlet 202, and has an inclined structure in which the upper-side height L4 is different from the lower-side height L5. The upper-side height L4 is set within a range from 0.3 times to 0.5 times the average height of the present embodiment 406, and the lower-side height L5 is set within a range from 1.5 times to 1.7 times the average height of the present embodiment 406.

In the case in which the upper-side height L4 of the present embodiment 406 is more than 0.5 times the average height of the present embodiment 406, and which the lower-side height L5 is more than 1.7 times, the added drag caused by the present embodiment 406 is increased. In the case in which the upper-side height L4 of the present embodiment is less than 0.3 times the average height of the present embodiment 406, and in which the lower-side height L5 is less than 1.5 times the average height of the present embodiment 406, the stern flow control effect is reduced.

The present embodiment 406 creates a vortex ahead of the cooling water outlet 202. This vortex causes the cooling water to deviate from the moving path of the cooling water before the present embodiment 406 is attached. In other words, the present embodiment 406 prohibits the cooling water from reaching a stern flow field, and thus changes the distribution of wake flow that encounters the propeller so that the distribution of the wake flow is symmetrical around the central axis of the hull.

Figure 13:
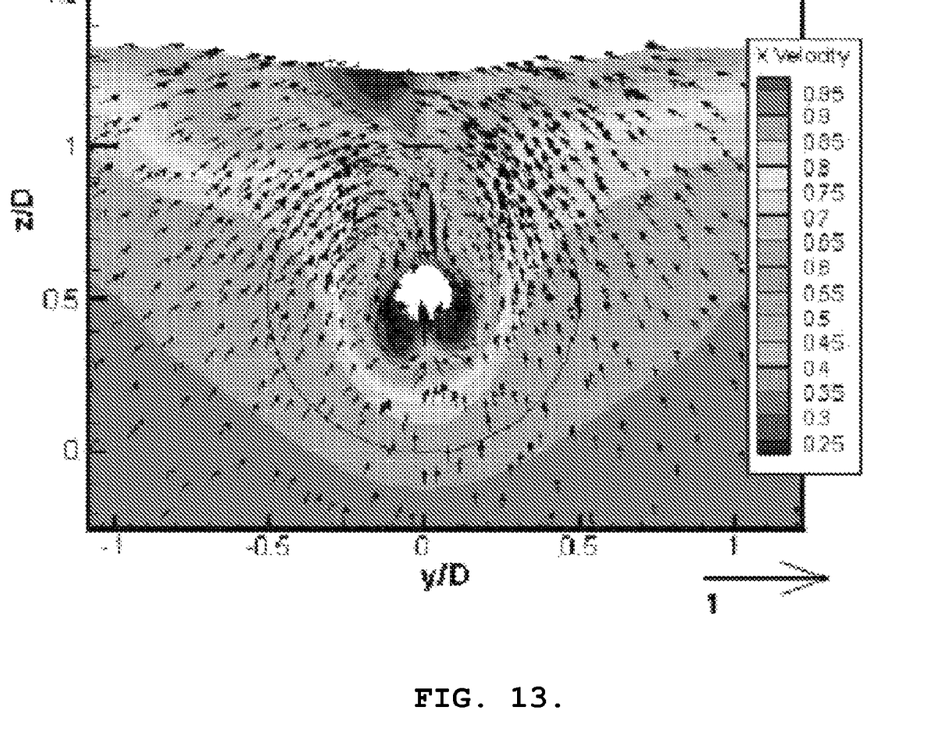
FIG. 13 illustrates the distribution of flow velocity across a propeller surface in the case in which the embodiment of FIG. 11 is attached when viewed from the stern.

FIG. 13 illustrates the distribution of flow velocity across a propeller surface in the case in which the embodiment of FIG. 11 is attached when viewed from the stern. In this case, it can be seen that the distribution of the wake flow that encounters the propeller is restored so as to be symmetrical around the central axis of the hull.

Figure 14:
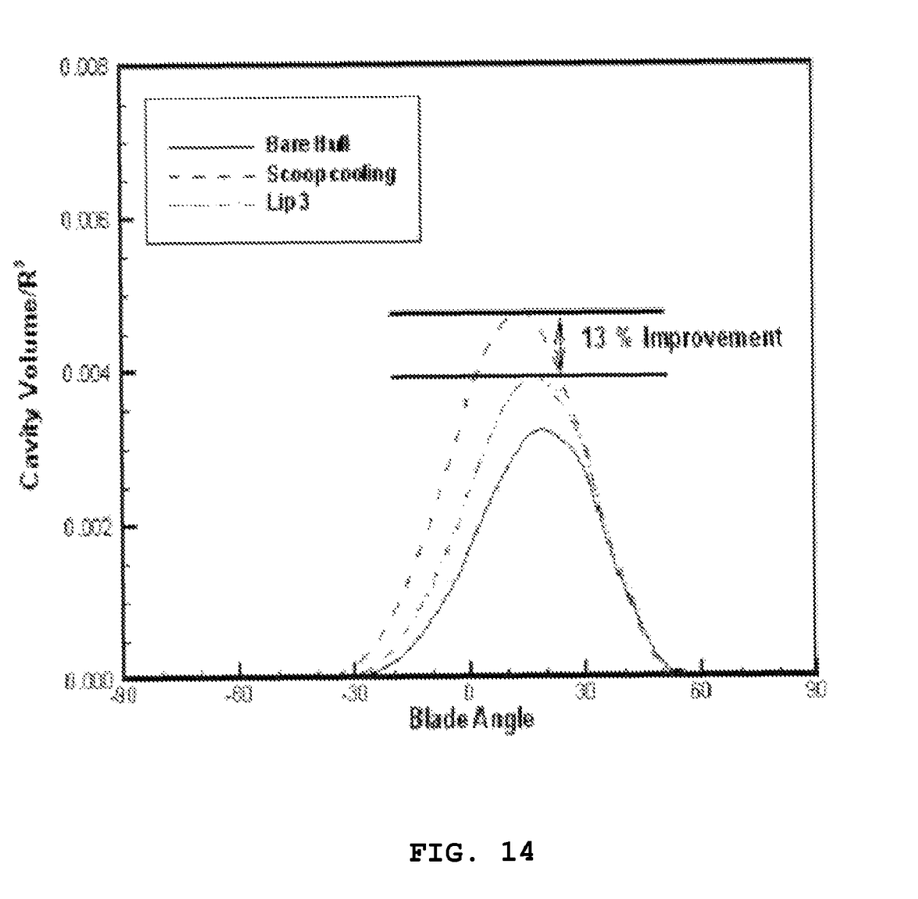
FIG. 14 is a graph showing the unit volume of a cavity with respect to the cases in which the cooling water is discharged, in which the cooling water is not discharged, and in which the embodiment of FIG. 11 is attached.

FIG. 14 is a graph showing the unit volume of a cavity with respect to the cases in which the cooling water is discharged, in which no cooling water is discharged, and in which the embodiment of FIG. 11 is attached. As can be seen from FIG. 14, the unit volume of the cavity is reduced by a maximum of 30%, compared to the case in which no stern flow control mechanism 406 is attached.

INDUSTRIAL APPLICABILITY

According to the present invention, the flow control mechanism restores the distribution of the wake flow that encounters the propeller so that it is symmetrical around the central axis of the hull, and reduces generation of the cavity. Thus, the vibration performance of the ship is improved, and the propulsive efficiency of the ship is also improved.

What is claimed is:

1. A flow control mechanism which controls a stern flow field disturbed by cooling water discharged from a cooling water outlet of a ship,
   wherein the flow control mechanism is located within a distance, which corresponds to three times a diameter of the cooling water outlet, from the cooling water outlet, is installed at an angle from 16° to 30° with respect to a horizontal plane of a hull, and
   has a vertical height, which is within a range from 0.2 times to 0.6 times the diameter of the cooling water outlet, in a vertical direction of the hull, and a horizontal width, which is within a range from 0.5 times to 1.3 times the diameter of the cooling water outlet, in a horizontal direction of the hull.

2. The flow control mechanism according to claim 1, wherein the flow control mechanism has a transverse width, which is within a range from 0.2 times to 0.6 times the diameter of the cooling water outlet and extends from an outer surface of the hull in a transverse direction of the hull.

3. A flow control mechanism which controls a stern flow field disturbed by cooling water discharged from a cooling water outlet of a ship, wherein:
   the flow control mechanism has a shape of a triangular pyramid that is located within 1 station ahead of the cooling water outlet along a streamline passing through the cooling water outlet;
   the triangular pyramid has a base, which is an isosceles triangle and has a base within a range from 0.2 times to 0.3 times as long as a diameter of the cooling water outlet, and a height within a range from 1.5 times to 1.7 times as long as the diameter of the cooling water outlet;
   a perpendicular line that extends from an apex of the triangular pyramid to the base of the triangular pyramid has a range from 0.6 times to 0.8 times as long as the diameter of the cooling water outlet; and
   an angle between the height of the base of the triangular pyramid and the streamline has a range from 10° to 15°.

4. The flow control mechanism according to claim 3, wherein the flow control mechanism is located within 0.8 stations ahead of the cooling water outlet along the streamline passing through the cooling water outlet.

* * * * *